(12) United States Patent
Li et al.

(10) Patent No.: US 9,533,597 B2
(45) Date of Patent: Jan. 3, 2017

(54) PARAMETER IDENTIFICATION OFFLOADING USING CLOUD COMPUTING RESOURCES

(71) Applicant: FORD GLOBAL TECHNOLOGIES, LLC, Dearborn, MI (US)

(72) Inventors: Yonghua Li, Ann Arbor, MI (US); Johannes Geir Kristinsson, Ann Arbor, MI (US); Fazal Urrahman Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 60 days.

(21) Appl. No.: 14/197,696

(22) Filed: Mar. 5, 2014

(65) Prior Publication Data

US 2015/0251555 A1 Sep. 10, 2015

(51) Int. Cl.
*B60L 9/00* (2006.01)
*G01R 31/36* (2006.01)
(Continued)

(52) U.S. Cl.
CPC .............. *B60L 11/1861* (2013.01); *B60L 3/12* (2013.01); *B60L 7/14* (2013.01); *B60L 11/123* (2013.01); *B60L 11/14* (2013.01); *B60L 11/1862* (2013.01); *B60L 11/1864* (2013.01); *B60L 11/1868* (2013.01); *B60L 11/1877* (2013.01); *B60L 15/2009* (2013.01); *B60W 10/04* (2013.01); *B60W 20/13* (2016.01); *B60L 2210/10* (2013.01); *B60L 2210/40* (2013.01); *B60L 2240/545* (2013.01); *B60L 2240/547* (2013.01); *B60L 2240/549* (2013.01); *B60L 2240/70* (2013.01); *B60L 2240/80* (2013.01); *B60L 2260/44* (2013.01); *B60W 2050/0037* (2013.01); *B60W 2510/244* (2013.01); *B60W 2510/246* (2013.01); *B60W 2510/248* (2013.01); *B60W 2710/248* (2013.01); *Y02T 10/6217* (2013.01); *Y02T 10/645* (2013.01);
(Continued)

(58) Field of Classification Search
USPC ............................................... 701/22; 702/63
See application file for complete search history.

(56) References Cited

U.S. PATENT DOCUMENTS 8,950,009 B2    2/2015  Vijayan et al.
8,989,954 B1 *  3/2015  Addepalli ............. H04W 4/046
                                                        370/328
(Continued)

OTHER PUBLICATIONS

Website http://www.wired.com/autopia/2011/04/toyota-microsoft-to-bring-the-cloud-to-cars/Squatriglia. Apr. 6, 2011, 12 pages, "Toyota, Microsoft to Bring the Cloud to Cars."

(Continued)

*Primary Examiner* — Thomas G Black
*Assistant Examiner* — Tyler Paige
(74) *Attorney, Agent, or Firm* — David B. Kelley; Brooks Kushman P.C.

(57) ABSTRACT

A vehicle may include battery cells of a battery and at least one controller configured to control the vehicle based on a state observation associated with the battery according to battery model parameters for the cells received from a computing device external to the vehicle and responsive to measurements relating to a battery model of the cells sent to the computing device.

20 Claims, 7 Drawing Sheets

(51) Int. Cl.
  B60L 11/18      (2006.01)
  B60W 10/04      (2006.01)
  B60L 3/12       (2006.01)
  B60L 7/14       (2006.01)
  B60L 11/12      (2006.01)
  B60L 11/14      (2006.01)
  B60L 15/20      (2006.01)
  B60W 50/00      (2006.01)

(52) U.S. Cl.
  CPC ........ Y02T 10/7005 (2013.01); Y02T 10/7044
      (2013.01); Y02T 10/7061 (2013.01); Y02T
      10/7066 (2013.01); Y02T 10/7077 (2013.01);
      Y02T 10/7216 (2013.01); Y02T 10/7241
      (2013.01); Y02T 10/7275 (2013.01); Y02T
      10/7291 (2013.01); Y02T 90/16 (2013.01)

(56)                 References Cited

U.S. PATENT DOCUMENTS

| | | |
|---|---|---|
| 9,098,876 B2 | 8/2015 | Steven et al. |
| 9,171,276 B2 | 10/2015 | Steven et al. |
| 2010/0121588 A1 | 5/2010 | Elder et al. |
| 2010/0185357 A1 | 7/2010 | Mizumachi |
| 2010/0196748 A1 | 8/2010 | Ellwanger |
| 2010/0317420 A1 | 12/2010 | Hoffberg |
| 2011/0029157 A1 | 2/2011 | Muzaffer |
| 2011/0202221 A1 | 8/2011 | Sobue et al. |
| 2012/0258777 A1 | 10/2012 | Huang |
| 2012/0290234 A1* | 11/2012 | Schaefer ............ G01R 31/3624 702/63 |
| 2012/0296482 A1 | 11/2012 | Steven |
| 2012/0317432 A1 | 12/2012 | Assad et al. |
| 2012/0330475 A1 | 12/2012 | Chen |
| 2013/0079964 A1* | 3/2013 | Sukkari ............... G01C 21/3697 701/22 |
| 2013/0097276 A1 | 4/2013 | Sridhar |
| 2013/0179007 A1* | 7/2013 | Dalum ................ B60W 20/108 701/2 |
| 2013/0179061 A1 | 7/2013 | Gadh et al. |
| 2013/0201316 A1 | 8/2013 | Binder et al. |
| 2014/0018985 A1* | 1/2014 | Gupta ................. B60W 20/104 701/22 |
| 2014/0210638 A1* | 7/2014 | Gussen .............. G01R 31/3606 340/870.09 |
| 2014/0278167 A1 | 9/2014 | Frost et al. |
| 2014/0316728 A1 | 10/2014 | Zhong et al. |
| 2014/0371962 A1* | 12/2014 | Smith ................. B60L 11/1824 701/22 |
| 2014/0379183 A1* | 12/2014 | Long ..................... B60W 40/12 701/22 |
| 2014/0379284 A1* | 12/2014 | Heo ................... G01R 31/3648 702/63 |
| 2015/0066224 A1* | 3/2015 | Uyeki ................... H02J 7/0027 700/291 |
| 2015/0158397 A1* | 6/2015 | Soto ......................... B60L 3/12 701/22 |
| 2015/0251556 A1 | 9/2015 | Meyer |

OTHER PUBLICATIONS

Abstract for Wu et al. Oct. 15-17, 2011, 1 Page, 2011 4th International Congress on Image and Signal Processing, "A Batter Management Sytem for Electric Vehicle Based on Zigbee and Can."
Non-Final Rejection of Dec. 21, 2015 in U.S. Appl. No. 14/197,725.

* cited by examiner

PARAMETER IDENTIFICATION OFFLOADING USING CLOUD COMPUTING RESOURCES

TECHNICAL FIELD

The disclosure relates to offloading parameter identification of slow-changing parameters using cloud computing resources.

BACKGROUND

Modern hybrid and electric vehicles utilize battery packs to provide energy for propulsion and for storing regenerated energy. Battery packs are typically composed of multiple individual battery cells that may be connected in parallel, series or some combination thereof. A characteristic of the battery pack is state of charge (SOC). The battery pack SOC is a measure of the fraction of the total charge that remains in the battery pack and may be considered analogous to a fuel gauge. SOC may be important for determining when and how to charge or discharge the battery pack. SOC may also be important for providing information to the driver, such as vehicle drive range, and for operating the vehicle.

SUMMARY

In a first illustrative embodiment, a vehicle includes a traction battery, and a controller configured to operate the vehicle based on model parameters for the battery received from a computing device external to the vehicle during a drive cycle and responsive to measurements relating to a model of the battery sent to the computing device by the controller during the drive cycle.

In a second illustrative embodiment, a system includes a computing device configured to receive, from a vehicle via a communication network during a drive cycle of the vehicle, battery cell measurements corresponding to a battery model of battery cells of the vehicle; and send, to the vehicle via the communication network during the drive cycle, battery model parameters for the cells responsive to the measurements.

In a third illustrative embodiment, a method includes controlling a vehicle based on a state observation associated with a battery of the vehicle according to battery model parameters for battery cells of the battery received by a vehicle controller during a drive cycle of the vehicle from a computing device external to the vehicle and responsive to measurements relating to a battery model of the cells sent to the computing device from the controller during the drive cycle.

DETAILED DESCRIPTION

Figure 1:
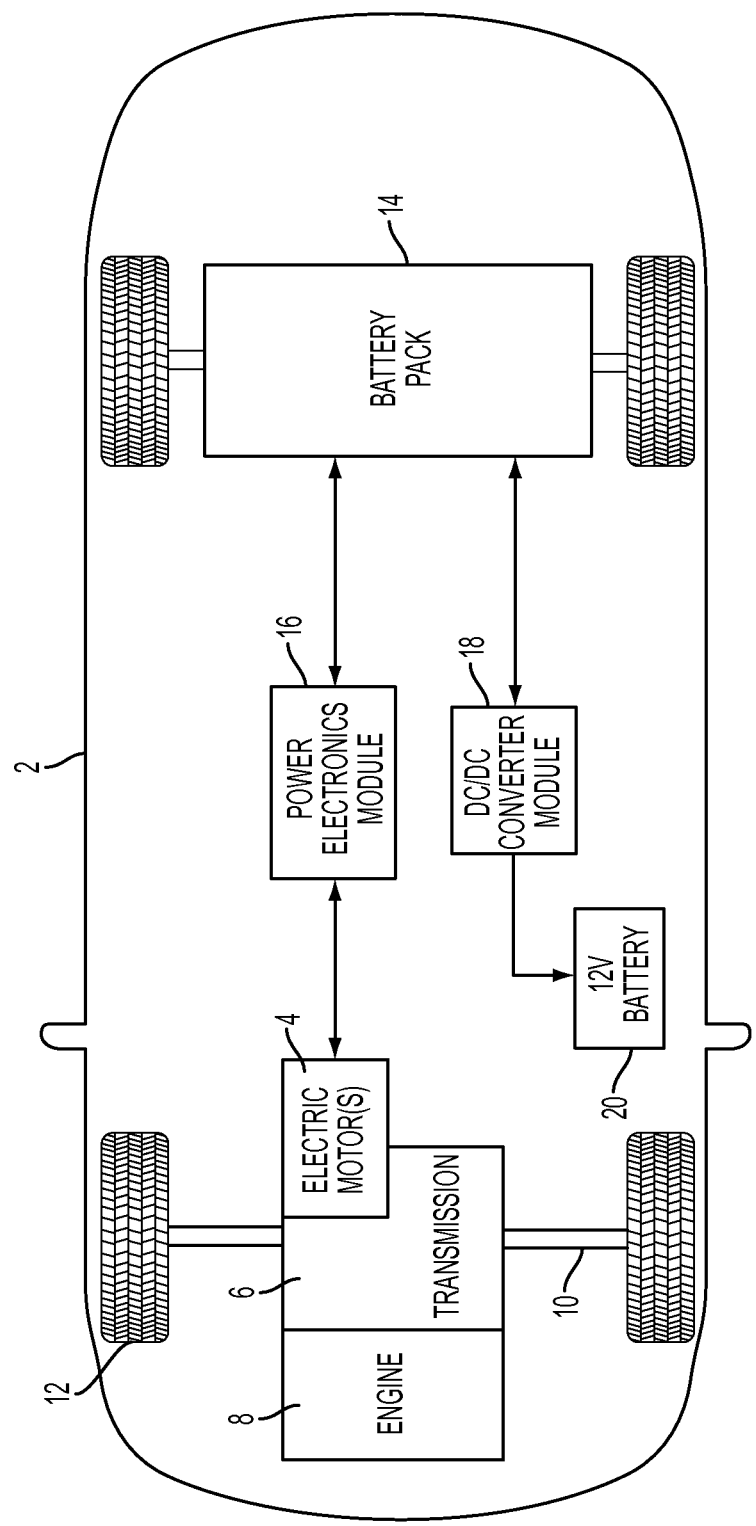
FIG. 1 is a diagram of a hybrid-electric vehicle illustrating drivetrain and energy storage components.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As electrified vehicles, such as Battery Electric Vehicles (BEVs) and Plug-in Hybrids (PHEVs), gain larger and larger batteries, estimation of SOC has become even more important. A possible method of calculating battery SOC is ampere-hour integration, in which a controller performs an integration of a battery pack current measurement over time. However, inaccuracy in the estimated SOC may occur due to factors including noise in the current measurement signal, current sensor bias, error in initial SOC value determination, and capacity value decay due to battery aging.

More accurate SOC estimation may utilize a model-based method, such as Kalman filtering, to determine SOC. A model-based method works by defining a model of a battery cell and then predicting the internal states of the battery cell based on some actual measured values. Estimated internal states may include, but are not limited to, voltages, currents, or SOC. A typical approach is to apply a Kalman filter to each cell of the battery pack, and then use these cell values for calculating the overall pack characteristics. This may require a battery control module capable of executing a number of Kalman filters that is equal to the number of cells present in the battery pack, as well as a memory capable of storing state information for each of the modeled cells. The number of cells in a battery pack varies, but a modern vehicle battery pack may consist of 60 to 100 or more cells.

Another model-based approach to SOC estimation includes separation of parameter identification and state observation of a Kalman filter into separate tasks. For example, a parameter identification module may receive inputs such as voltage, current, temperature and the last estimated open circuit voltage for the battery (referred to herein interchangeably as OCV or $V_{OC}$), and may use those inputs to determine battery equivalent circuit model parameters to be provided to an OCV estimation module. The OCV estimation module may perform state observation according to the model parameters received from the parameter identification module, to estimate at least one state of the battery, such as battery OCV. A SOC calculation module may receive the estimated battery OCV from the OCV estimation module, and determine the battery SOC according to a mapping of OCV to SOC.

While model-based methods produce more exact battery parameter estimations, such approaches require greater computing and memory storage resources as the number of cells of the battery increases, which in turn may require upgraded vehicle processing hardware at increased vehicle cost.

Rather than performing SOC estimation solely by the vehicle, aspects of the SOC computation may be offloaded to a computing service external to the vehicle. One such external computing service may include a cloud-based computing server accessible via a network connection from the vehicle to the Internet. For example, using a model-based approach to SOC estimation including separation of parameter identification and state observation, the parameter identification task may be offloaded to the external service, reducing the amount of computation and state required to be maintained by the vehicle. In such an approach, the vehicle may collect input information regarding a vehicle battery (e.g., voltage, current, temperature, OCV, etc.), forward the information to the external service, and receive model parameters from the service, e.g., battery equivalent circuit model parameters to be used in OCV estimation to complete the SOC calculation.

As the battery equivalent circuit model parameters are relatively slow-changing variables, latency in their computation by a remote server may still provide acceptable accuracy in SOC estimation. Moreover, as the state observation using the battery equivalent circuit model parameters is relatively less computation-intensive than parameter estimation, improved SOC estimation may be possible without requiring upgraded vehicle processing hardware.

While the parameter computation offloaded to a computing service external to the vehicle is described herein with respect to determination of SOC, it should be noted that the techniques described herein are equally applicable to other types of calculations in which a parameter calculation portion can be split from an observer portion of a modeled computation, such as for battery power capability calculation and battery health estimation, as some other examples. Moreover, the techniques described herein are equally applicable to other types of models than battery equivalent circuit models. For example, electro-chemical model parameter identification or another control-oriented model with parameters to be learned in real time may similarly be offloaded to external computing resources.

FIG. 1 depicts a hybrid-electric vehicle 2. The typical hybrid-electric vehicle 2 may include one or more electric motors 4 mechanically connected to a hybrid transmission 3. In addition, the hybrid transmission 6 is mechanically connected to an engine 8. The hybrid transmission 6 is also mechanically connected to a drive shaft 10 that is mechanically connected to the wheels 12. The electric motors 4 can provide propulsion and deceleration capability when the engine 8 is turned on or off. The electric motors 4 also act as generators and can provide fuel economy benefits by recovering energy that would normally be lost as heat in the friction braking system. The electric motors 4 may also provide reduced pollutant emissions since the hybrid electric vehicle 2 may be operated in electric mode under certain conditions.

The battery pack 14 stores energy that can be used by the electric motors 4. A vehicle battery pack 14 typically provides a high voltage DC output. The battery pack 14 is electrically connected to the power electronics module 16. The power electronics module 16 is also electrically connected to the electric motors 4 and provides the ability to bi-directionally transfer energy between the battery pack 14 and the electric motors 4. For example, a typical battery pack 14 may provide a DC voltage while the electric motors 4 may require a three-phase AC current to function. The power electronics module 16 may convert the DC voltage to a three-phase AC current as required by the electric motors 4. In a regenerative mode, the power electronics module 16 will convert the three-phase AC current from the electric motors 4 acting as generators to the DC voltage required by the battery pack 14. The method described herein is equally applicable to a pure electric vehicle or any other device using a battery pack.

In addition to providing energy for propulsion, the battery pack 14 may provide energy for other vehicle electrical systems. A typical system may include a DC/DC converter module 18 that converts the high voltage DC output of the battery pack 14 to a low voltage DC supply that is compatible with other vehicle loads. Other high voltage loads may be connected directly without the use of a DC/DC converter module 18. In a typical vehicle, the low voltage systems are electrically connected to a 12V battery 20.

Figure 2:
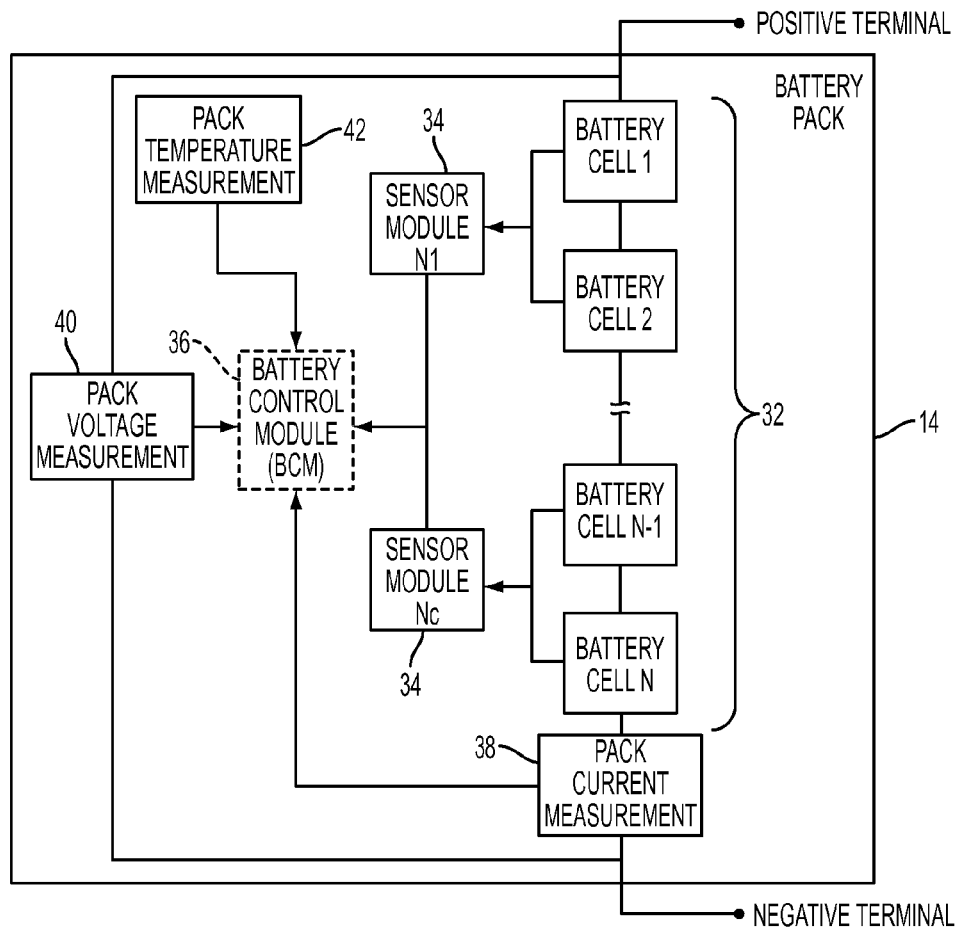
FIG. 2 is a diagram of a possible battery pack arrangement comprised of multiple cells, and monitored and controlled by a battery control module.

Battery packs 14 may be constructed from a variety of chemical formulations. Typical battery pack 14 chemistries are lead acid, nickel-metal hydride (NIMH) or Lithium-Ion. FIG. 2 shows a typical battery pack 14 in a simple series configuration of N battery cells 32. Other battery packs 14, however, may be composed of any number of individual battery cells connected in series or parallel or some combination thereof. A typical system may have a one or more controllers, such as a battery control module (BCM) 36 that monitors and controls the performance of the battery pack 14. The BCM 36 may monitor several battery pack 14 level characteristics such as pack current 38, pack voltage 40 and pack temperature 42.

In addition to the pack level characteristics, there may be battery cell level characteristics that need to be measured and monitored. These characteristics may include, for example, voltage, current, and temperature of the battery cells. A system may use sensor modules 34 to measure the battery cell characteristics. Depending on the capabilities, the sensor module 34 may measure the characteristics of one or multiple of the battery cells 32. As some possibilities, a sensor module 34 may provide a module temperature representative of the temperature of a single cell or of a group of several cells of the pack. The battery pack 14 may utilize up to N, sensor modules 34 to measure the characteristics of all the battery cells 32. Each sensor module 34 may transfer the measurements to the BCM 36 for further processing and coordination. The sensor module 34 may transfer signals in analog or digital form to the BCM 36.

Figure 3:
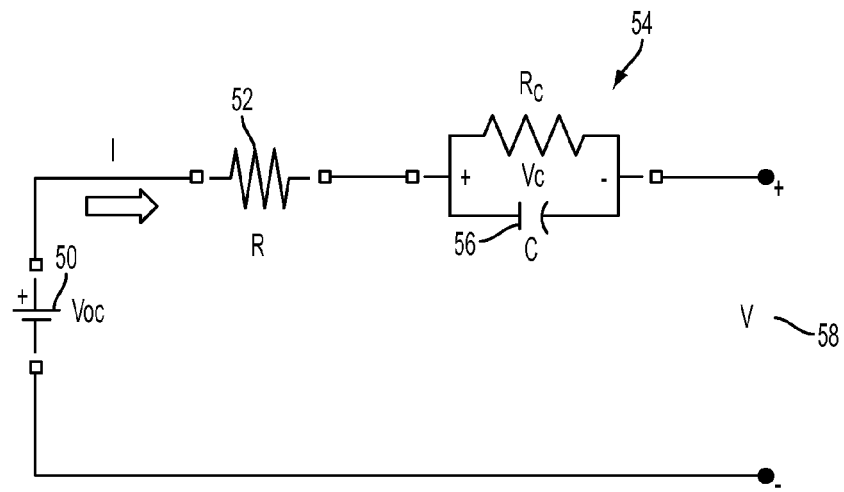
FIG. 3 is a diagram of an example battery cell equivalent circuit.

FIG. 3 shows a typical battery cell equivalent circuit model. A battery cell can be modeled as a voltage source ($V_{oc}$) 50 having resistances (52 and 54) and capacitance 56 associated with it. Because of the battery cell impedance, the terminal voltage, V 58, is typically not the same as the open-circuit voltage, $V_{oc}$ 50. The open-circuit voltage, $V_{oc}$ 50, is not readily measurable as only the terminal voltage 58 of the battery cell is accessible for measurement. Because the $V_{oc}$ 50 is not readily measurable, a model-based method may be used to estimate the value. Any model will require that the values of resistance and capacitance be known or estimated. Note that the battery cell model may depend on the battery chemistry, and the precise model chosen for the battery cell is not critical. For example, the model may be a battery equivalent circuit model, a battery electro-chemical model, or some other model of the battery cell or components of the cell.

The SOC and OCV can be related by a monotonically increasing, one-to-one, first-order differentiable function:

$$V_{oc} = f(SOC) \qquad (1)$$

A state space equation for the battery equivalent circuit model in the illustrated embodiment may be developed as follows. The derivatives of $V_{OC}$ with respect to time can be related to that of the SOC vs. time as shown below:

$$\frac{dV_{oc}}{dt} = \frac{dV_{oc}}{dSOC} * \frac{dSOC}{dt} \quad (2)$$

Let $$\alpha = \frac{1}{C_c} \quad (3)$$

$$\beta = -\frac{1}{C_c * R_c}$$

$$\gamma = -R$$

According to the battery equivalent circuit model in FIG. 3:

$$V_{oc}(t) = R * I(t) + V_c(t) + V(t) \quad (4)$$

$$C_c * \frac{dV_c(t)}{dt} = I(t) - \frac{V_c(t)}{R_c}$$

Based on equation (1), with the assumed property that function f is first-order differentiable:

$$\frac{dV_{oc}}{dt} = -\frac{dV_{oc}}{dSOC} * \frac{\eta I}{Q} \quad (5)$$

Combining equations (4) and (5):

$$\begin{bmatrix} \frac{dV_{oc}}{dt} \\ \frac{dV_c(t)}{dt} \end{bmatrix} = \begin{bmatrix} 0 & 0 \\ 0 & -\frac{1}{C_c * R_c} \end{bmatrix} * \begin{bmatrix} V_{oc} \\ V_c(t) \end{bmatrix} + \begin{bmatrix} \frac{dV_{oc}}{dSOC} * \eta \\ Q \\ \frac{1}{C_c} \end{bmatrix} * I \quad (6)$$

$$V(t) = [1 \ -1] * \begin{bmatrix} V_{oc}(t) \\ V_c(t) \end{bmatrix} + [-R] * I \quad (7)$$

Recalling equation (3):

$$\begin{bmatrix} \frac{dV_{oc}}{dt} \\ \frac{dV_c(t)}{dt} \end{bmatrix} = \begin{bmatrix} 0 & 0 \\ 0 & \beta \end{bmatrix} * \begin{bmatrix} V_{oc} \\ V_c(t) \end{bmatrix} + \begin{bmatrix} \frac{dV_{oc}}{dSOC} * \eta \\ Q \\ \alpha \end{bmatrix} * I \quad (8)$$

$$V(t) = [1 \ -1] * \begin{bmatrix} V_{oc}(t) \\ V_c(t) \end{bmatrix} + \gamma * I \quad (9)$$

Based on equation (4), an objective is to identify the model parameters, and estimate the SOC (via OCV) at the same time. In an embodiment of the invention, an observer can be designed based on equations (8) and (9):

$$\begin{bmatrix} \frac{d\hat{V}_{oc}}{dt} \\ \frac{d\hat{V}_c(t)}{dt} \end{bmatrix} = \begin{bmatrix} 0 & 0 \\ 0 & -\frac{1}{C_c * R_c} \end{bmatrix} * \begin{bmatrix} \hat{V}_{oc} \\ \hat{V}_c(t) \end{bmatrix} + \begin{bmatrix} \frac{dV_{oc}}{dSOC} \hat{V}_{oc}^\eta \\ Q \\ \frac{1}{C_c} \end{bmatrix} * I + \quad (10)$$

$$L * (V(t) - \hat{V}(t))$$

$$\hat{V}(t) = [1 \ -1] * \begin{bmatrix} \hat{V}_{oc}(t) \\ \hat{V}_c(t) \end{bmatrix} + [-R] * I \quad (11)$$

In the illustrated embodiment, the observer described above is utilized to solve an indirect adaptive observation problem. It is appreciated that details of the observer may vary depending on the application.

In the illustrated embodiment, the following approach is used for parameter identification. From equations (4) and (5):

$$\frac{dV_{oc}}{dt} = -\frac{dV_{oc}}{dSOC} * \frac{\eta I}{Q} \quad (12)$$

$$C_c * \frac{dV_c(t)}{dt} = I(t) - \frac{V_c(t)}{R_c}$$

$$V(t) = V_{oc}(t) - V_c(t) - R_r * I(t)$$

By obtaining a relationship between the parameters and system variables and then discretize the relationship:

$$[V(t) - V_{oc}(t)] = \begin{bmatrix} \frac{dV_{oc}(t)}{dt} - \frac{dV(t)}{dt} I(t) \frac{dI(t)}{dt} \end{bmatrix} * \begin{bmatrix} R_c * C_c \\ R + R_c \\ R * R_c * C_c \end{bmatrix} \quad (13)$$

The discretized form is:

$$\left[ \frac{T_s}{2} * (V_{oc}(k+1) - V(k+1) + V_oc(k) - V(k)) \right] = \quad (14)$$

$$\left[ ((V(k+1) - V(k)) - (V_{oc}(k+1) - V_{oc}(k)) \frac{T_s}{2} * \right.$$

$$\left. (i(k+1) + i(k))i(k+1) - i(k) \right] * \begin{bmatrix} R_c * C_c \\ R + R_c \\ R * R_c * C_c \end{bmatrix}$$

One method that is widely used is the Kalman filter approach to slow-varying parameter identification. It is part of the family of recursive parameter estimation methods.

First, equation (14) is re-written as:

$$Y(k) = \Phi^T(k) * \Theta(k) \quad (15)$$

Then the Kalman filter-based recursive parameter estimation scheme can be expressed as:

$$\hat{\Theta}(k+1) = \hat{\Theta}(k) + K(k) * (Y(k+1) - \Phi^T(k) * \hat{\Theta}(k)) \quad (16)$$

$$K(k+1) = Q(k+1) * \Phi(k+1)$$

$$Q(k+1) = \frac{P(k)}{R_2 + \Phi(k+1)^T * P(k) * \Phi(k+1)}$$

$$P(k+1) = P(k) + R_1 - \frac{P(k)*\Phi(k)*\Phi(k)^T*P(K)}{R_2 + \Phi(k+1)^T*P(k)*\Phi(k+1)}$$

Where $\hat{\Theta}(k+1)$ is the estimated parameter vector, K, Q, P are related intermediate variable (matrices), and $R_1$ and $R_2$ are constants (calibratable variables).

It is appreciated that the Kalman filter approach to parameter identification is one possible approach that may be used. In the alternative, any recursive estimation scheme may be used, with varying robustness and accuracy.

Turning now to the SOC estimation, once a recursive estimation algorithm is chosen and the circuit parameters are well-learned, a nonlinear observer estimates the states ($V_{OC}$, $V_C$).

In the illustrated embodiment, assuming the related parameters have been identified from equation (16), the observer may be realized using the identified parameters:

$$\begin{bmatrix} \frac{d\hat{V}_{oc}}{dt} \\ \frac{d\hat{V}_c(t)}{dt} \end{bmatrix} = \begin{bmatrix} 0 & 0 \\ 0 & -\frac{1}{\hat{C}_c * \hat{R}_c} \end{bmatrix} * \begin{bmatrix} \hat{V}_{oc} \\ \hat{V}_c(t) \end{bmatrix} + \begin{bmatrix} \frac{dV_{oc}}{dSOC}\hat{V}_{oc}^\eta \\ \frac{1}{\hat{C}_c} \end{bmatrix} * I + \quad (17)$$

$$L*(V(t) - \hat{V}(t))$$

$$\hat{V}(t) = [1 \quad -1] * \begin{bmatrix} \hat{V}_{oc}(t) \\ \hat{V}_c(t) \end{bmatrix} + [-\hat{R}] * I \quad (18)$$

Let $$e(t) = \begin{bmatrix} V_{oc}(t) \\ V_c(t) \end{bmatrix} - \begin{bmatrix} \hat{V}_{oc}(t) \\ \hat{V}_c(t) \end{bmatrix} \quad (19)$$

$$\frac{de(t)}{dt} = \left( \begin{bmatrix} 0 & 0 \\ 0 & -\frac{1}{\hat{C}_c * \hat{R}_c} \end{bmatrix} - L*[1 \quad -1] \right) * e(t) + \quad (20)$$

$$\left( \begin{bmatrix} \frac{dV_{oc}}{dSOC}V_{oc}^\eta \\ \frac{1}{\hat{C}_c} \end{bmatrix} - \begin{bmatrix} \frac{dV_{oc}}{dSOC}\hat{V}_{oc}^\eta \\ \frac{1}{\hat{C}_c} \end{bmatrix} \right) * I$$

$$= \begin{bmatrix} -L_1 & L_1 \\ -L_2 & L_2 - \frac{1}{\hat{C}_c * \hat{R}_c} \end{bmatrix} * e(t) +$$

$$\begin{bmatrix} -\frac{\left( \frac{dV_{oc}}{dSOC}V_{oc}^\eta - \frac{dV_{oc}}{dSOC}\hat{V}_{oc}^\eta \right)*\eta}{Q} \\ 0 \end{bmatrix} * I$$

Assuming exact estimation of circuit parameters, by properly selecting gain L the observer shown above may be made stable. For the illustrated observer, a fixed gain (L matrix) may be selected to operate for the entire family of Li-Ion batteries represented by equations (8) and (9). More specifically, the observer gain L may be selected such as $L_1>0$, $L_2=0$ so the error dynamics are always stable for the entire family of the battery under any operating conditions.

Notably, as parameter identification and state observation are separate tasks in the described model, the parameter identification task may be performed by a different computing device from the state observation task. As one example, the state observation task may be performed by the BCM 36 of the vehicle, while the parameter estimation task may be offloaded to a computing service external to the vehicle. As the parameter identification is relatively more computationally expensive than state observation, offloading the parameter identification task reduces the amount of computation and computer memory required to be maintained by the vehicle.

Figure 4:
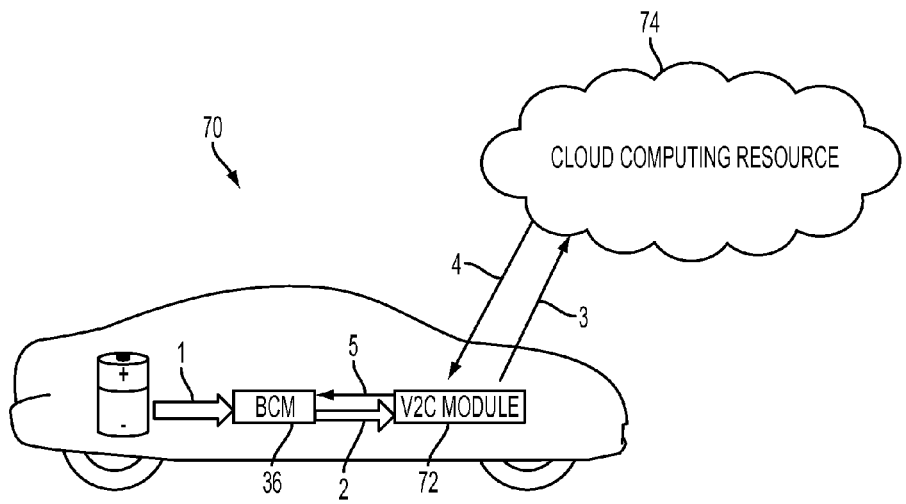
FIG. 4 is a diagram of a cloud-based architecture for offloading parameter identification tasks from a vehicle.

FIG. 4 is a diagram of a cloud-based architecture 70 for offloading parameter identification tasks from a vehicle. The architecture 70 includes a BCM 36 in communication with a vehicle to cloud module 72, wherein the cloud module 72 is configured to facilitate vehicle communications with cloud computing resources 74.

As indicated in the architecture 70 as flow (1), the BCM 36 may be configured to manage the battery and perform battery cell measurements of various battery variables. Moreover, as indicated by flow (2), BCM 36 may be further configured to forward the measurements to the cloud module 72. The cloud module 72 may be configured to receive the measurements, package the measurements, and, as indicated by flow (3), forward the package measurements over a mobile link to the cloud computing resource 74 (e.g., via a vehicle telematics controller). Using a battery model, such as the battery equivalent circuit model discussed in detail above, the cloud computing resource 74 may be configured to calculate battery model parameters based on the received measurements. Other models may be used for remote computation of other types of values, such as a battery health model for battery health estimation, an electro-chemical model for electro-chemical model parameter identification, etc. As indicated by flow (4), the cloud computing resource 74 may be further configured to return a response over the mobile link to the cloud module 72 including the determined model parameters. The cloud module 72 may receive the response, and, as indicated by flow (5), forward the model parameters back to the BCM 36. The BCM 36 may accordingly use the model parameters computed by the resource 74 to perform state estimation. Accordingly, by using the cloud-based architecture 70, the vehicle is able to offload determination of model parameters that may be expensive or difficult for the BCM 36 to compute using its own computing capacities.

Figure 5:
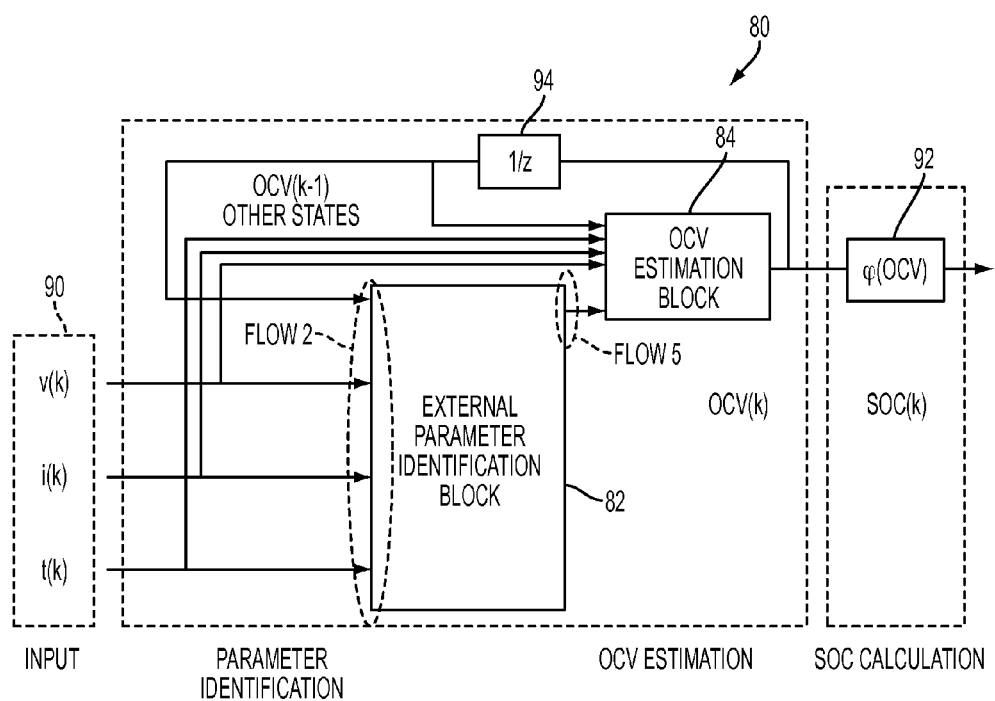
FIG. 5 is a diagram of a state of charge observer architecture utilizing the cloud-based architecture for offloading parameter identification tasks.

FIG. 5 is a diagram of a state of charge observer architecture 80 utilizing the cloud-based architecture 70 for offloading parameter identification tasks. The architecture 80 includes inputs 90 such as voltage, current and temperature. An external parameter identification block 82 implemented using the cloud-based architecture 70 may be configured to receive the inputs 90 and provides model parameters. An OCV estimation block 84 may be configured to receive the model parameters and estimate OCV. An SOC calculation block 92 may be configured to map the estimated OCV to SOC. A delay block 94 may be configured to feed the estimated OCV back to the parameter identification block 82. While an exemplary modularization of the architecture 80 is described herein, it should also be noted that that the functionality may be incorporated into more, fewer, or different blocks of functionality.

As illustrated, the parameter identification block 82 may be configured to receive inputs 90 to be used in calculating model parameters. For a battery equivalent circuit model, these inputs 90 may include, as some examples, voltage, current, temperature, and a previous estimated OCV. The inputs 90 may include information received by the BCM 36 from the sensor modules 34, such as cell level voltage, current and temperature measurements, as well as battery pack 14 level characteristics received by the BCM 36 such as pack current 38, pack voltage 40 and pack temperature 42.

As mentioned above, the Kalman filter approach may be useful for performing parameter identification for slow-varying parameters. Because of the relatively slow variance in the parameter identification, as well as the computational complexity involved, the parameter identification portion of the Kalman filter may be suitable for offloading to the cloud computing resource 74. Thus, rather than performing the parameter identification on the BCM 36, the parameter identification block 82 may be configured to provide the collected inputs 90 to cloud module 72 for processing by the cloud computing resource 74 (e.g., flow 2 as illustrated in the architecture 70). The parameter identification block 82 may be further configured to receive battery equivalent circuit model parameters back from the cloud computing resource 74 via the cloud module 72 (e.g., flow 5 as illustrated in the architecture 70). Further aspects of the messaging between the BCM 36 and the cloud computing resource 74 are discussed in detail with respect to FIGS. 7-10 below.

The OCV estimation block 84 may be configured to estimate the battery pack 14 OCV. For example, an observer of the OCV estimation block 84 may be driven according to the model parameters received from the parameter identification block 82. The observer may be implemented according to a model such as the battery cell equivalent circuit model illustrated in FIG. 3 and explained in detail above.

Figure 6:
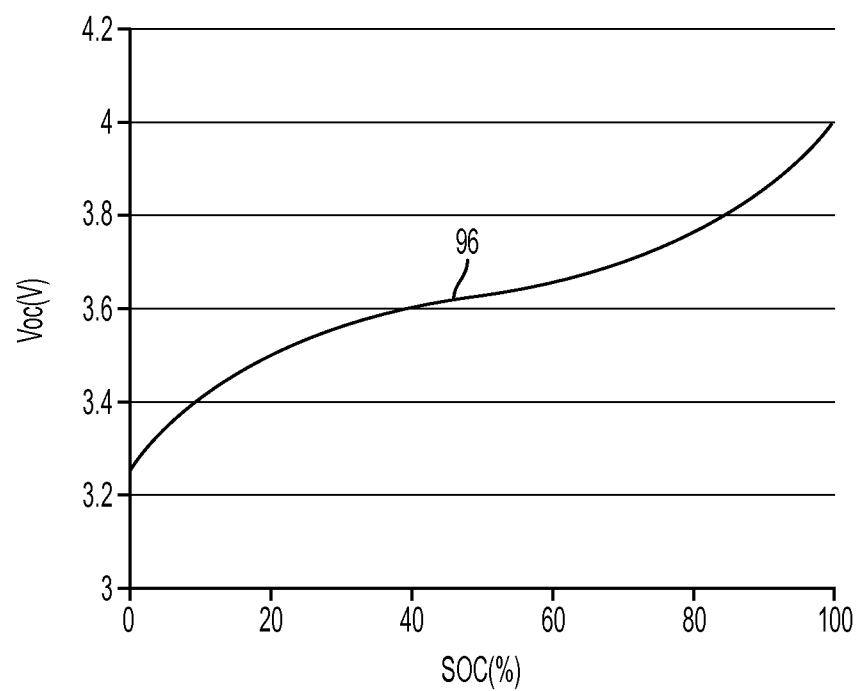
FIG. 6 is a diagram of a sample relationship curve between battery open circuit voltage and battery state of charge.

The SOC calculation block 92 may be configured to determine the battery SOC. For example, the SOC calculation block 92 may receive an OCV value from the OCV estimation block 84, and may utilize a nonlinear mapping of OCV to SOC to determine an SOC for the battery pack 14. FIG. 6 illustrates an exemplary mapping of OCV to SOC. As shown in the illustrated relationship curve 96 between battery OCV and battery SOC charge, SOC and OCV may be related according to a monotonically increasing, one-to-one, first-order differentiable function, such as that discussed above with respect to equation (1).

Returning to FIG. 5, the delay block 94 may be configured to provide the estimated OCV back to the parameter identification block 82 for use in a future round of parameter identification as the last estimated OCV value. Notably, as the offloading of the parameter identification to the cloud computing resource 74 may involve additional latency as compared to a local calculation, additional delay blocks 94 before the inputs 90 to the parameter identification module 82 are not shown, and may be optional or unnecessary.

Figure 7:
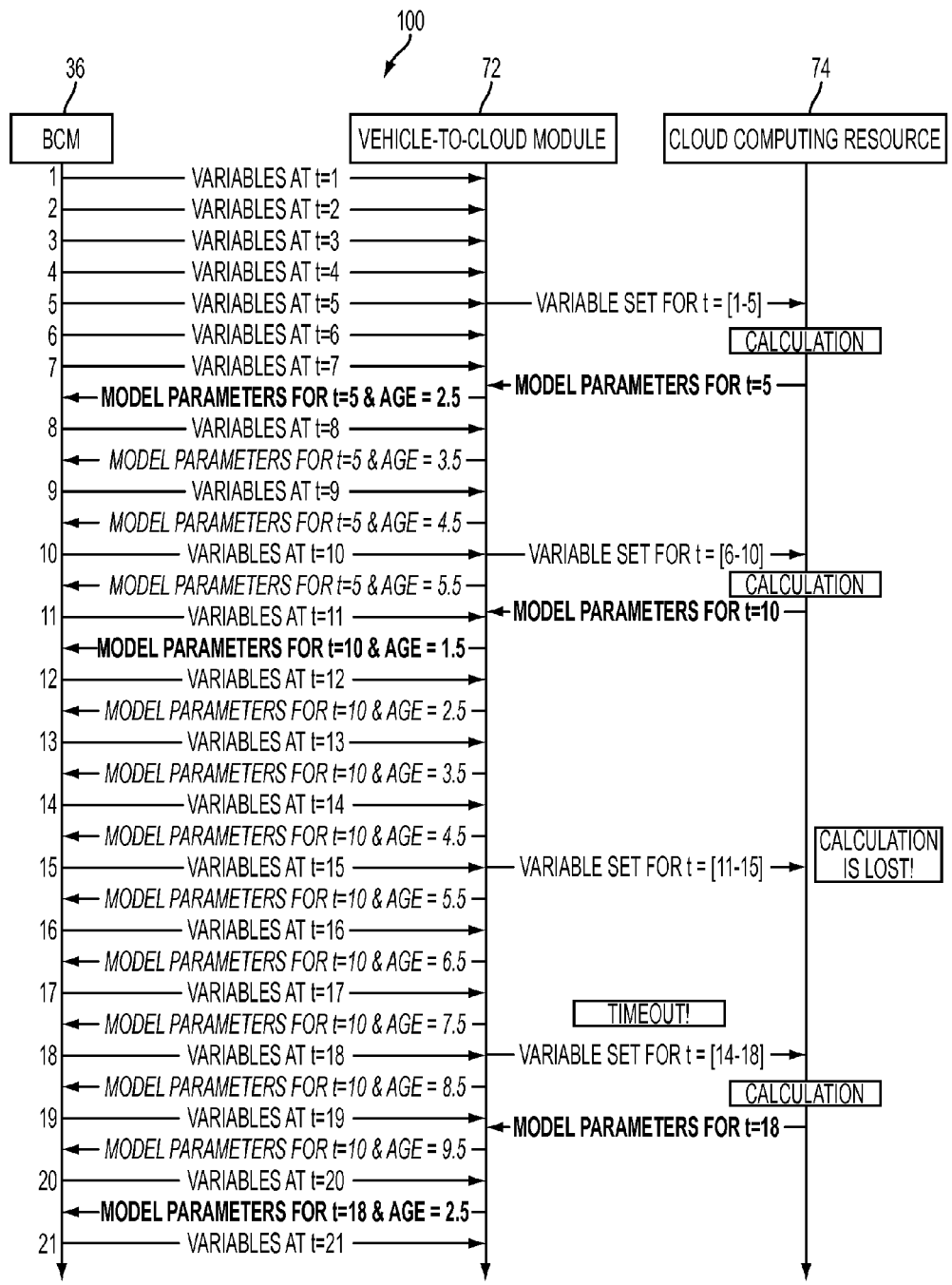
FIG. 7 is a timing diagram illustrating an exemplary interaction between a battery control module of a vehicle and a cloud computing resource using a cloud module.

FIG. 7 is a timing diagram 100 illustrating an exemplary interaction between the BCM 36 of the vehicle and the cloud computing resource 74 using the cloud module 72. As illustrated, the BCM 36 may be configured to periodically provide battery measurements to the cloud module 72. The provided measurements may be collected by the cloud module 72 into packages of multiple recent measurements (e.g., the last 5 measurements, the last 10 measurements, individual measurements. etc.), and provided to the cloud computing resource 74. When the cloud module 72 completes a package, the cloud module 72 may send the completed package to the cloud computing resource 74. For instance, as illustrated the cloud module 72 collects measurements with a package size of 5. Once the first 5 sets of measurements have been received, the cloud module 72 may send a first package of measurements to the computing resource 74. This occurs in the timing diagram 100 at a time index t=5. The package may include additional information as well, such as a time index of the most recent measurement received by the cloud module 72.

The cloud computing resource 74 may receive the package of measurements sent from the cloud module 72, and may perform model parameter identification calculations on the measurements. Upon completing the calculations, the cloud computing resource 74 may send the model parameter results to the cloud module 72 responsive to the received package of measurements. The response sent from the cloud computing resource 74 may further include an indication of the samples used to determine the model parameters. For instance, the results may include a time index of the most recent measurement used to determine the model parameters, a time index at which the measurements were received by the cloud computing resource 74, a time index of at which the measurements were sent from the cloud module 72, or a sequence number incremented for each set of results sent to the vehicle, as some possibilities.

As it may take some time for the cloud computing resource 74 calculation to occur (e.g., in excess of the interval between battery measurements provided to the cloud module 72), the cloud module 72 may be configured to continue to receive and process the battery measurements received from the BCM 36, despite not having received the response from the cloud computing resource 74.

The cloud module 72 may receive the model parameters from the cloud computing resource 74. As illustrated, the model parameters corresponding to measurements over time indexes 1-5 are shown as being received by the cloud module 72 between time indexes 7 and 8. The cloud module 72 may accordingly begin to supply the received parameters back to the BCM 36 (e.g., for use by the OCV estimation block 84). (In some cases, before any model parameters are returned to the cloud module 72, the cloud module 72 may provide updates to the BCM 36 indicating that no model parameters are available, or including default model parameters or last known model parameters.) In some examples, when no model parameters are available to the BCM 36, the BCM 36 may default to another technique of SOC computation, such as ampere-hour integration. As illustrated, the cloud module 72 periodically provides the parameters to the BCM 36, e.g., at time indexes t=[7.5, 8.5, 9.5] as shown. It should be noted that the timing and interval of providing of the parameters back to the BCM 36 may vary. For example, the parameters may be provided from the cloud module 72 to the BCM 36 at a slower or faster interval than the providing of the measured variables to the cloud module 72. As another example, the parameters may be provided from the cloud module 72 to the BCM 36 responsive to receiving updated model variables from the cloud computing device 304 instead of or in addition to the periodic messages.

The cloud module 72 may further provide an indication of the age of the parameters to the BCM 36 along with the parameters. For example, the cloud module 72 may determine an age of the model parameters as the difference between the time index at which the model parameters are being provided to the BCM 36 and the time index of the most recent captured set of measured variables used to determine the model parameters. This age may allow the BCM 36 to be aware of how old the model parameters being used actually are. If the model parameters are determined by the BCM 36 to be too old for use, the BCM 36 may default to another technique of SOC computation, such as ampere-hour integration.

As mentioned above, the cloud module 72 may be configured to continue to receive and process battery measurements provided by the BCM 36. Continuing with the example of packages of the 5 measurements, at time index 10 the cloud module 72 may provide a second package of measurements to the cloud computing resource 74 including variables for time indexes t=[6-10]. The cloud computing resource 74 may receive the second package of measurements, perform model parameter calculations, and provide a response to the cloud module 72 including a second set of model parameters corresponding to the time indexes t=[6-10]. The cloud module 72 may accordingly receive the updated model parameters, and supply the updated model parameters to the BCM 36.

Similarly, at time index 15 the cloud module 72 may be configured to provide a third package of measurements to the cloud computing resource 74. However, in the illustrated example, the cloud module 72 does not receive a set of model parameters based on the third package of measurements. This may have occurred for various reasons, such as a communication issue in sending the measured variables to the cloud computing resource 74, a calculation issue at the cloud computing resource 74 in determining the model parameters, or a communication issue in receiving the model parameters from the cloud computing resource 74, as some possibilities.

The cloud module 72 may be configured to wait up to a timeout period for a response from the cloud computing resource 74. If no such response is received within the timeout period, then the cloud module 72 may be configured to issue another calculation request. For example, if the cloud module 72 determines that it has not received a response from the cloud computing resource 74 within three time indexes (e.g., timeout Δt=3), the cloud module 72 may issue a new calculation request to the cloud computing resource 74. However, instead of using the original measured variables for which a response was not received (e.g., for time indexes t=[11-15] in the illustrated example), the cloud module 72 may instead use the latest variables in the re-issued request (which at time index t=18 for a package size of 5 includes measurements corresponding to the time indexes t=[14-18]). Including the latest data in the re-issued request may help to ensure that the calculated model parameters are more up to date, but may cause the cloud computing resource 74 to lose some historic data (in this case for time indexes t=[11-13]) if the cloud computing resource 74 maintains such information.

Notably, the estimations that are sent between cloud module 72 and BCM 36 at t=8.5-10.5 and at t=12.5-19.5 include model parameters that are repeats of the model parameters provided at t=7.5 and 11.5 respectively, but with an increased age indicator. The cloud module 72 may provide these periodic updates as the BCM 36 may be running continuous control system and may expect a "current" input, whereas the cloud computing resource 74 may be more of an event-based system that acts on inputs. The cloud module 72 may accordingly converts between these two aspects by periodically providing the current available model parameters along with its age. It should be further noted that in other examples, these repeat updates may not be required, and the BCM 36 may instead continue to reuse previously provided model parameters without the updates.

Figure 8:
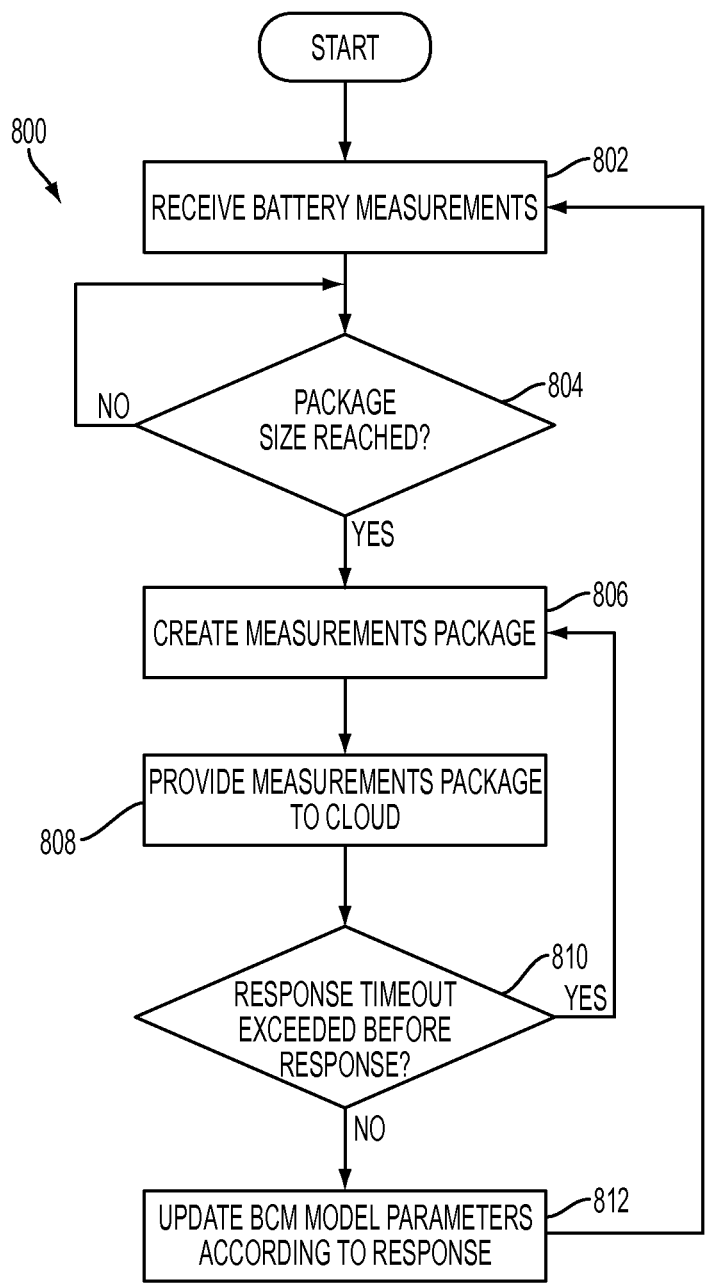
FIGS. 8-10 are diagrams of a method for offloading parameter identification tasks from a vehicle to a cloud-based architecture.

FIG. 8 is a diagram of a method 800 for offloading parameter identification tasks from a vehicle. The method 800 may be performed, for example, by the cloud module 72 in communication between the BCM 36 and the cloud computing resource 74.

At block 802, the cloud module 72 receives battery measurements. For example, the cloud module 72 may receive battery measurements from the BCM 36. The battery measurements may include, for example, voltage, current and temperature measurements received by the BCM 36 from the sensor modules 34. The battery measurements may also include battery pack 14 level characteristics received by the BCM 36 such as pack current 38, pack voltage 40 and pack temperature 42.

At decision point 804, the cloud module 72 determines whether a package size is reached. For example, the received battery measurements may be collected by the cloud module 72 until a predetermined number of measurements are received. As one non-limiting example, as illustrated in FIG. 7 the predetermined number may be 5. If the predetermined number of measurements is received, control passes to block 806. Otherwise control passes to block 802.

At block 806, the cloud module 72 creates a measurements package. For example, the cloud module 72 may include the predetermined number of battery measurements in a package. The package may include additional information as well, such as time index of the most recent measurement, or time index at which the most recent measurement was received by the cloud module 72.

At block 808, the cloud module 72 provides a message including the measurements package to the remote computing resource 74. For example, the cloud module 72 may utilize a telematics unit of the vehicle to send the measurements package to an address of a remote computing resource 74 configured to receive measurements packages from vehicles. As one possibility, the remote computing resource 74 may be implemented as an Internet-accessible cloud service.

At decision point 810, the cloud module 72 determines whether a response was received to the message including the measurements package. For example, the cloud module 72 may be configured to wait for up to a predetermined timeout period for a response from the cloud computing resource 74. If no such response is received within the timeout period, then the cloud module 72 may be configured to issue another calculation request. If the cloud module 72 determines that no response was received, control passes to block 806. Notably, instead of using the original measured variables from the request for which a response was not received, the cloud module 72 returning to block 806 may instead use the latest variables in the re-issued request. If a response is received, then control passes to block 812.

At block 812, the cloud module 72 provides model parameters included in the response to the BCM 36. The cloud module 72 may further include an age of the model parameters in the response (e.g., determined as the difference between the time index at which the model parameters are being provided to the BCM 36 and the time index of the most recent captured set of measured variables used to determine the model parameters). The BCM 36 may accordingly use the model parameters to perform state observation to estimate at least one state of the battery. As one possibility, the BCM 36 may utilize the model parameters perform the state observation to estimate a battery OCV, and estimate battery SOC based on a mapping of battery OCV to SOC. After block 812, control passes to block 802.

Figure 9:
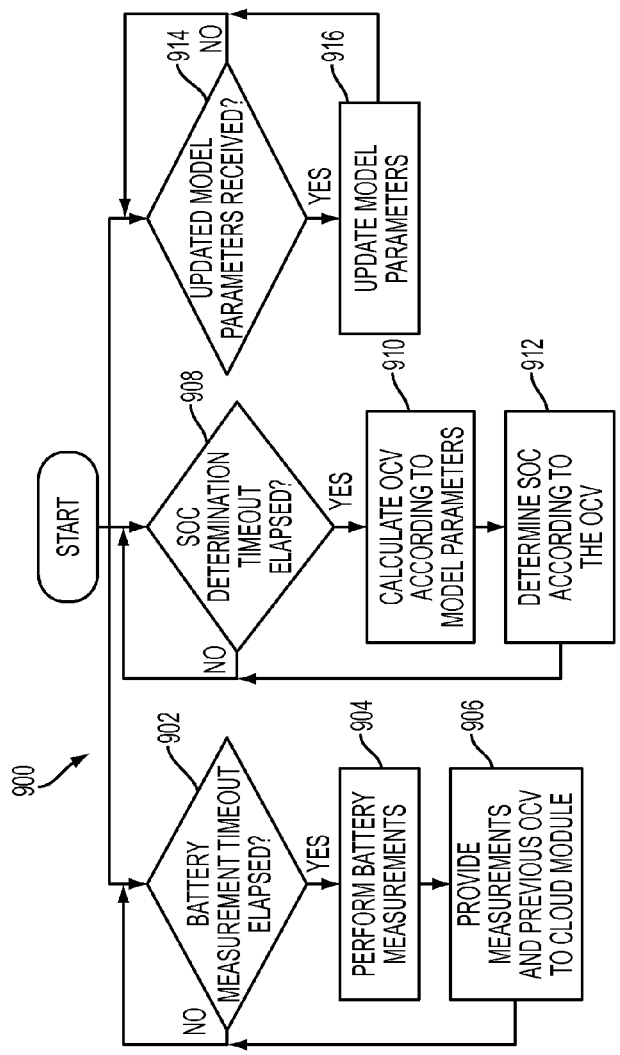

FIG. 9 is a diagram of a method 900 for offloading parameter identification tasks from a vehicle. The method 900 may be performed, for example, by the BCM 36 in communication with the cloud module 72 facilitating access to the cloud computing resources 74. It should be noted that the method 900 includes multiple branches (e.g., beginning at decision points 902, 908 and 914), which may be executed as one or more processes or process flows that may be run independent from one another.

At decision point 902, the BCM 36 determines whether a battery measurement timeout has elapsed. For example, the BCM 36 may be configured to periodically provide battery measurements to the cloud module 72 (e.g., every second, every 15 seconds, every 3 minutes, etc.) If the battery measurement timeout has expired, control passes to block 904. Otherwise, control remains at decision point 902.

At block 904, the BCM 36 performs battery measurement. For example, the BCM 36 may utilize sensor modules 34 of the vehicle to measure battery cell characteristics, such as the voltage, current, and temperature of each cell may be measured. As another example, the BCM 36 may measure battery pack 14 level characteristics, such as pack current 38, pack voltage 40 and pack temperature 42.

At block 906, the BCM 36 provides the battery measurements to the cloud module 72. For example, the BCM 36 may send one or more messages over a vehicle bus to the cloud module 72 including the battery measurements. The BCM 36 may further provide additional information to the cloud module 72 that may be useful for determination of model parameters based on the utilized model, such as a previously computed OCV value determined according to an earlier state observation performed by the BCM 36. After block 904, control passes to decision point 902.

At decision point 908, BCM 36 determines whether an SOC determination timeout has elapsed. For example, the BCM 36 may be configured to periodically determine SOC for use by vehicle systems such as the hybrid drivetrain, or user interface elements of the vehicle that indicate the current level of charge. The SOC determination may be performed periodically as well (e.g., every second, every 15 seconds, every 3 minutes, etc.) If the SOC determination timeout has expired, control passes to block 910. Otherwise, control remains at decision point 908.

At block 910, the BCM 36 calculates battery OCV according to model parameters. For example, an observer of the OCV estimation block 84 of the BCM 36 may be driven according to parameters received from the parameter identification block 82. The observer may be implemented according to a model such as the battery cell equivalent circuit model illustrated in FIG. 3 and explained in detail above.

At block 912, the BCM 36 determines SOC according to the OCV. For example, the SOC calculation block 92 of the BCM 36 may receive the OCV from the OCV estimation block 84, and may utilize a relationship curve 96 between VOC to SOC to determine an SOC for the battery pack 14. FIG. 6 illustrates an exemplary mapping of VOC to SOC. After block 912, control passes to decision point 908.

At decision point 914, the BCM 36 determines whether updated model parameters were received by the BCM 36. For example, the BCM 36 may identify whether model parameters were received by the BCM 36 from the control module 72, or whether model parameters received from the control module 72 are more recent than the model parameters currently being maintained by the BCM 36. The BCM 36 may utilize one or more of a time index of the model parameters, an age of the model parameters, or a sequence number of in the model parameters to determine whether the received model parameters are more recent. If the model parameters are determined by the BCM 36 to be updated, control passes to block 916. Otherwise control remains at decision point 914.

At block 916, the BCM 36 updates the model parameters maintained by the BCM 36. After block 916, control passes to decision point 914.

Figure 10:
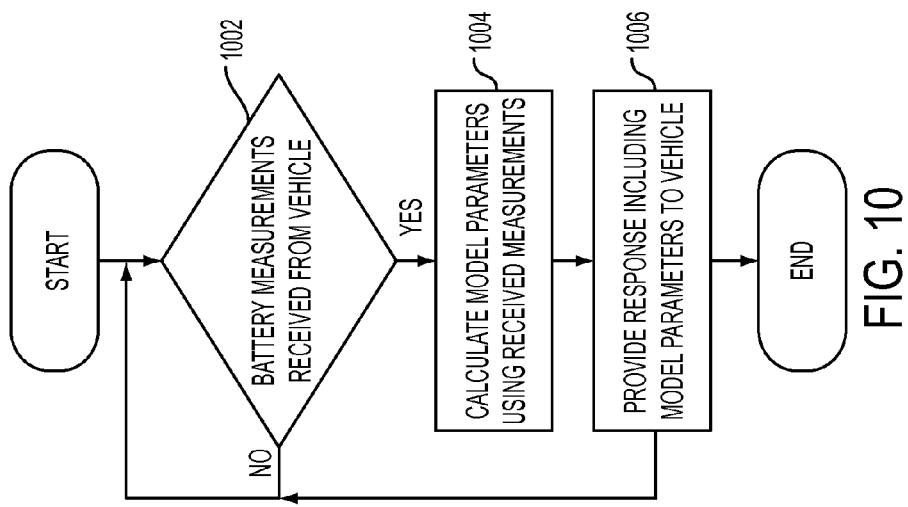

FIG. 10 is a diagram of a method 1000 for offloading parameter identification tasks from a vehicle. The method 1000 may be performed, for example, by the cloud computing resource 74 in communication with the cloud module 72 interfacing to the BCM 36.

At decision point 1002, the cloud computing resource 74 determines whether battery measurements have been received from a vehicle. For example, a cloud module 72 of a vehicle may have provided a message to the cloud computing resource 74, such as discussed above with respect to the method 800. If a message is received, control passes to block 1004 to process the message. Otherwise control remains at decision point 1002.

At block 1004, the cloud computing resource 74 calculates model parameters using the received measurements. For example, parameter estimation may be performed by the cloud computing resource 74 according to the battery cell equivalent circuit model illustrated in FIG. 3 and explained in detail above.

At block 1006, the cloud computing resource 74 provides a response to the vehicle including the calculated model parameters. Accordingly, by using the cloud-based architecture 70, the vehicle is able to offload determination of model parameters that may be expensive or difficult for the BCM 36 to compute using its own computing capacities. After block 1006, control passes to decision point 1002.

Thus, through use of remote cloud computing resources 74, a vehicle may be able to offload parameter identification, reducing the amount of computation to be performed and the state required to be maintained by the vehicle. Moreover, as the state observation using remotely computed model parameters is relatively less computation-intensive than parameter estimation for the vehicle, improved state estimation may be possible without requiring upgraded vehicle processing hardware.

As one possibility, the disclosed offloading techniques may be applied to improved SOC estimation performed utilizing a BCM 36 of a vehicle. As one example, as model parameters may be relatively slow-changing variables, latency in their computation by a remote server may still provide acceptable accuracy in SOC estimation. Moreover, as the state observation using the battery model parameters is relatively less computation-intensive than parameter estimation, improved SOC estimation may be possible without requiring upgraded vehicle processing hardware. As some other possibilities, the techniques described herein are equally applicable to other types of models and calculations in which a parameter calculation portion can be split from an observer portion of a modeled computation, such as for battery power capability calculation and battery health estimation.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a traction battery; and
a controller configured to send measurements relating to a system model of an internal state of the battery to a computing device external to the vehicle during a drive cycle, and operate the vehicle based on model parameters for the system model received from the computing device during the drive cycle responsive to parameter identification performed by the computing device using the measurements.

2. The vehicle of claim 1, wherein the measurements include measurements of battery voltage, battery current and battery temperature.

3. The vehicle of claim 1, wherein the controller is further configured to periodically collect the measurements of the battery and wherein the measurements include a predetermined number of periodically collected measurements.

4. The vehicle of claim 1, wherein the model includes a battery equivalent circuit model and wherein the controller is further configured to:

perform a state observation to estimate a battery open circuit voltage (OCV) using the model parameters; and estimate battery state of charge (SOC) based on a mapping of battery OCV to SOC.

5. The vehicle of claim 4, wherein the measurements further include a previous estimate of battery OCV.

6. The vehicle of claim 4, wherein the controller is further configured to at least one of (i) provide an indication of available battery charge in a user interface of the vehicle according to the SOC and (ii) utilize the SOC to configure operation of a hybrid drivetrain of the vehicle.

7. The vehicle of claim 4, wherein the controller is further configured to default to ampere-hour integration to calculate SOC when (i) the model parameters have not been received, or (ii) the model parameters are older than a predetermined age threshold.

8. The vehicle of claim 4, wherein the state observation includes at least one of power capability determination and battery health monitoring.

9. A system comprising:

a computing device configured to receive, from a vehicle via a communication network during a drive cycle of the vehicle, battery cell measurements corresponding to a battery model of battery cells of the vehicle;

perform parameter identification using the measurements to determine battery model parameters; and send, to the vehicle via the communication network during the drive cycle, the battery model parameters for the cells responsive to the measurements.

10. The system of claim 9, wherein the measurements include measurements of cell voltage, cell current and cell temperature.

11. The system of claim 9, wherein the measurements include a predetermined number of periodically collected battery measurements.

12. The system of claim 9, wherein the battery model includes a battery equivalent circuit model configured to supply battery equivalent circuit model parameters to estimate a battery open circuit voltage (OCV).

13. The system of claim 12, wherein the measurements further include a previous estimate of battery OCV.

14. The system of claim 9, wherein the measurements further include a time indication of when at least a subset of the battery cell measurements were collected and wherein the computing device is further configured to send the time indication with the battery model parameters.

15. A method comprising:

controlling a vehicle based on a state observation associated with a battery of the vehicle according to battery model parameters for battery cells of the battery received by a vehicle controller during a drive cycle of the vehicle from a computing device external to the vehicle performing parameter identification responsive to measurements relating to a battery model of the cells sent to the computing device from the controller during the drive cycle.

16. The method of claim 15, wherein the measurements include measurements of cell voltage, cell current and cell temperature.

17. The method of claim 15, further comprising periodically collecting the measurements of the battery cells, wherein the measurements include a predetermined number of periodically collected measurements.

18. The method of claim 15, wherein the battery model includes a battery equivalent circuit model, and further comprising:

performing the state observation to estimate a battery open circuit voltage (OCV) using the model parameters; and estimating battery state of charge (SOC) based on a mapping of battery OCV to SOC.

19. The method of claim 18, wherein the measurements further include a previous estimate of battery OCV.

20. The method of claim 18, further comprising at least one of (i) providing an indication of available battery charge in a user interface of the vehicle according to the SOC and (ii) utilizing the SOC to configure operation of a hybrid drivetrain of the vehicle.

* * * * *